(12) United States Patent
Lindemann et al.

(10) Patent No.: US 6,799,155 B1
(45) Date of Patent: Sep. 28, 2004

(54) REPLACEMENT OF EXTERNALLY MOUNTED USER INTERFACE MODULES WITH SOFTWARE EMULATION OF USER INTERFACE MODULE FUNCTIONS IN EMBEDDED PROCESSOR APPLICATIONS

(75) Inventors: Brian Lindemann, Olathe, KS (US); Daniel R. Barbour, Overland Park, KS (US)

(73) Assignee: Allied Signal Inc., Morristown, NJ (US)

( * ) Notice: Subject to any disclaimer, the term of this patent is extended or adjusted under 35 U.S.C. 154(b) by 0 days.

(21) Appl. No.: 09/459,067

(22) Filed: Dec. 10, 1999

Related U.S. Application Data
(60) Provisional application No. 60/111,953, filed on Dec. 11, 1998.

(51) Int. Cl.[7] .......................... G06F 9/455; G06G 19/06
(52) U.S. Cl. .............................. 703/24; 703/14; 703/26; 455/558
(58) Field of Search ............................. 703/14, 16, 23, 703/24, 26, 27; 455/445, 411, 458, 558, 557; 380/273; 235/380, 487; 713/182

(56) References Cited

U.S. PATENT DOCUMENTS

| | | | | | |
|---|---|---|---|---|---|
| 4,816,653 | A | * | 3/1989 | Anderl et al. | 235/380 |
| 5,781,723 | A | * | 7/1998 | Yee et al. | 395/186 |
| 6,223,984 | B1 | * | 5/2001 | Renner et al. | 235/380 |
| 6,311,165 | B1 | * | 10/2001 | Coutts et al. | 705/21 |
| 6,324,402 | B1 | * | 11/2001 | Waugh et al. | 455/445 |
| 6,325,293 | B1 | * | 12/2001 | Moreno | 235/492 |
| 6,397,080 | B1 | * | 5/2002 | Viktorsson et al. | 455/558 |
| 6,405,030 | B1 | * | 6/2002 | Suprunov | 455/410 |
| 6,422,459 | B1 | * | 7/2002 | Kawan | 235/380 |
| 6,504,932 | B1 | * | 1/2003 | Vasnier et al. | 380/273 |

OTHER PUBLICATIONS

US patent application publication No. US 2001/0017863 A1, issued to McMillian et al., on Aug. 2001.*

* cited by examiner

*Primary Examiner*—Thai Phan (57) ABSTRACT

The present invention is a method and apparatus for implementing in embedded software the functionality of one or more external user interface circuits either in a surface mountable integrated circuit or in the main system CPU of a telecommunication unit.

24 Claims, 2 Drawing Sheets

REPLACEMENT OF EXTERNALLY MOUNTED USER INTERFACE MODULES WITH SOFTWARE EMULATION OF USER INTERFACE MODULE FUNCTIONS IN EMBEDDED PROCESSOR APPLICATIONS

This application claims the benefit of U.S. Provisional Application Serial No. 60/111,953, filed in the names of Brian Lindemann and Daniel R. Barbour on Dec. 11, 1998, the complete disclosure of which is incorporated herein by reference.

FIELD OF THE INVENTION

Subscriber Interface Modules, or "Smart Cards," including a microprocessor, and in particular the installation, programming and accessing of such subscriber interface modules.

BACKGROUND OF THE INVENTION

Portable data or information carriers in the form of a card or the like are known. Such carriers are commonly known as Subscriber Interface Modules (SIMs), or "smart cards." As disclosed in U.S. Pat. No. 4,816,653, the complete disclosure of which is incorporated by reference herein, the SIM looks and feels much like an ordinary credit card, but the SIM includes a computer, an electrically erasable programmable read-only memory (EEPROM), and also circuitry for receiving a combined power and timing signal from a card reader/writer optionally located within an associated device or station. These card components and circuitry also receive and transmit data signals between the card and, via the reader/writer, the associated device or station. The SIM is thus a small portable article including an electronic arrangement having a microprocessor coupled to an electrically programmable read-only memory.

The SIM is used in many industries to provide secure access to personal data, such as bank account numbers, medical records, and telephone access codes. Conventional SIMs, however, generally hold just one application. One SIM might be used for a banking/financial application, while another SIM might be dedicated to a security application for entry to a building or workplace, while yet another smart card might be dedicated to access a telephone system. In general, the internal handling of data by the SIM deprives a would-be defrauder of any opportunity to learn the nature of information required to use the SIM.

In order to maximize the confidentiality of information stored in the SIM, and more specifically to limit the amount of information available to a would-be defrauder monitoring data lines or radio frequency carriers connecting the data SIM to external devices, the SIM includes a microprocessor and a memory operatively associated with the microprocessor. According to one embodiment disclosed in U.S. Pat. No. 4,211,919, the complete disclosure of which is incorporated by reference herein, the memory has three zones: a secret zone in which reading and writing operations are permitted by internal circuits of the SIM; a working zone in which any reading or writing operations are permitted; and a read zone where only reading operations are permitted.

The secret zone of the memory disclosed in U.S. Pat. No. 4,211,919 includes at least one key or code which is compared to a key received from a device external to the SIM for determining whether a particular operation is authorized. The secret zone includes an ERROR zone and an ACCESS zone in which information is stored indicating attempted access or access to strictly confidential data requiring the use of a key. The microprogram stores one bit in one or the other of these two zones each time access to the SIM is requested. Therefore, performing read and write functions in predetermined zones of the memory is possible, provided that a secret code or key is fed into the data SIM.

More particularly, according to U.S. Pat. No. 4,211,919, the operations to be performed are monitored and handled internally and continuously by a microprogram which is stored in memory and executed by the microprocessor. The SIM functions are summarized as follows:

(1) sequential reading and writing of memory in the authorized zones starting from a given address;

(2) acquisition and checking of an enabling key by comparing the key with a word which is written in a secret zone of the application memory, and therefore inaccessible from outside the SIM;

(3) authorization or denial of reading and writing;

(4) systematic self-checking of the writing in the memory;

(5) ordering internal storage of errors and/or successful attempts at access; and (6) disabling previous functions when the number of errors, i.e., unsuccessful attempts, reaches a predetermined maximum count.

As disclosed in U.S. Pat. No. 4,816,653, a vast amount of computing power and memory are present right in the SIM. The SIM is capable of carrying the account numbers of all of the owner's charge accounts, the balances of all of the accounts, the credit limits of all of the accounts. The card is also capable of carrying other such personal data as, for example, personal telephone directories, and personal telephone access codes. The presence of such data in a portable SIM requires suitable security for the data on the SIM. SIM components and circuitry exchange authorization data with appropriate application software residing in the device or station, when enable by an appropriate password. A suitably configured application device or station, which includes a computer or dedicated workstation that executes application software necessary for accessing the memory in the SIM enables the retrieval and modification of information stored in the SIM memory.

Certainty that the device or station is communicating with an authentic file on an authentic SIM is achieved by assigning each card a unique serial number and using this number, or subset thereof, along with a concealed application password residing in the device or station. These numbers are manipulated algorithmically to produce an authentication code which is stored in the application's file on the SIM at the time of creation. During subsequent transactions, this code must be favorably compared to a similar code generated independently by the device or station to enable a transaction. The SIM requires a user to provide a password before access to files other than those at the public level is permitted. Security is further ensured by restricting the number of unsuccessful password attempts.

According to U.S. Pat. No. 4,816,653, the SIM is fully passive and not able to initiate any transaction with the device or station. Rather, the reader/writer signals 'attention' to the device or station. The device or station responds to the 'attention' signal and interrogates the reader/writer to determine the reason for the 'attention' signal.

U.S. Pat. No. 5,721,781, the complete disclosure of which is incorporated by reference herein, discloses a SIM that is assigned its own digital certificate containing a digital signature from a trusted certifying authority and a unique public key. Additionally, the cardholder is required to enter a unique Personal Identification Number (PIN) to complete a transaction. The PIN is passed to the SIM for use in authenticating the cardholders identity. The system disclosed in U.S. Pat. No. 5,721,781 includes a terminal that is capable of accessing the SIM. The terminal has at least one compatible application which operates in conjunction with an application on the smart card. To begin a transaction, the SIM and terminal enter an authentication phase wherein the terminal verifies that it is communicating with an authorized SIM. This usually entails the SIM forwarding its own access code to the terminal for verification. The SIM uses the terminal's public key that it received in the terminal's certificate to send a message. Only the terminal can decrypt the message using its private key. Similarly, the terminal can encrypt a reply message using the SIM's public key and only the SIM can decrypt the message. The encryption algorithms introduce "digital signatures" which are employed to ensure that the appropriate parties are communicating with each other. Thus, when the SIM encrypts a message using the terminal's public key, it tags a personalized digital signature onto the message. The SIM encrypts the combined message using its own private key.

The terminal receives the communication and decrypts it using the SIM's public key. This decryption yields a scrambled part that contains the encrypted message and a legible part that consists of the SIM's signature. Since the communication was decrypted using the SIM's public key, it follows that only the SIM (using its private key) could have encrypted the entire communication. Thus, upon seeing the SIM's digital signature, the terminal is assured that the communication truly came from the SIM. The terminal discards the digital signature and then decrypts the other part using its own private key to obtain the original message. The encryption scheme therefore ensures for the receiving party (i.e., the terminal in this example) that the communication is from the desired sending party (i.e., the SIM) and that only the receiving party can read the original message. Following authentication, one or more transactions are conducted and the card is removed from the terminal, ending the session.

U.S. Pat. No. 5,237,612, the complete disclosure of which is incorporated by reference herein, discloses a system for the validation and verification of base stations and mobile stations within a cellular radio communications network using SIMs. The system includes a fixed key and a changeable key which are applied as inputs to a proprietary authentication algorithm. The algorithm generates key-dependent responses, at least one of which is independent of the changeable key. The responses generated by a particular mobile station are compared to the responses generated by the network and the presence of fraudulent users may be detected.

As disclosed in U.S. Pat. No. 5,237,612, mobile registration is the process by which a mobile telephone unit becomes listed as being present in the service area of one of the mobile exchanges in a mobile telephone service network. As each mobile telephone unit enters a new area within the network, it sends a unique identity signal which is detected by the mobile exchange associated with that area. This exchange records an indication of the presence of the mobile subscriber in its memory and then informs all the other exchanges of the presence of the mobile subscriber within its coverage area at that particular moment. When the mobile subscriber crosses over into another area, the exchange associated with that area, upon receiving an identity signal from the telephone unit, will record an indication of the mobile subscriber's presence there and then transmit the identity signal to all of the other exchanges together with its own identity signal, for the purpose of updating the mobile subscriber's position.

As described in U.S. Pat. No. 5,237,612, in other known solutions, a mobile subscriber's identity and position messages are sent by each exchange, whose respective areas are crossed by such mobile subscriber, to a specific center. Any exchange in the mobile network which contacts this center may receive all the information necessary for locating and making a connection to the mobile subscriber. This solution eliminates the need to advise one or more of the other mobile exchanges each time a mobile subscriber enters a new area without making or receiving a call there, and thereby reduces the amount of mobile subscriber location data that must be processed by each of the mobile exchanges within the network.

In some systems, the aforementioned center may be a common national center such as that used in the mobile telephone location system disclosed in U.S. Pat. No. 4,700,374, the complete disclosure of which is incorporated by reference herein. As described in U.S. Pat. No. 5,237,612, in other systems, the center may be the exchange to which a mobile subscriber is assigned (the "home exchange"). In such other systems, the mobile subscriber may preregister in an area other than the normal service and billing area (the "home area") for service to be provided in the other area (the "visited area") by the exchange associated with the visited area (the "visited area"). When a roaming subscriber arrives in the visited area, the mobile subscriber is qualified to make telephone calls from there and calls which are received in the mobile subscriber's home area are forwarded to the visited area for transmission to the mobile subscriber.

U.S. Pat. No. 5,237,612 discloses a procedure and hardware for providing adaptable authentication of a mobile station within a radio network. U.S. Pat. No. 5,237,612 also discloses a method for the verification and validation of a mobile station in a radio network in accordance with an authentication algorithm executed in each of the mobile station and the network. A random number signal is transmitted from the network to the mobile station. A set of inputs, including the random number signal transmitted from the network to the mobile station, a fixed key value and a changeable key value are applied to the authentication algorithm. A set of outputs including a first response signal, which is dependent on the fixed key value and independent of the changeable key value, and a second response signal, which is dependent on the changeable key value, are generated from the authentication algorithm. The first and second response signals are transmitted to the network and compared with the first and second response signals generated in the network.

As disclosed in U.S. Pat. No. 5,444,764, the complete disclosure of which is incorporated by reference herein, in current radiotelephone systems such as the Global System for Mobile Communications (GSM) radiotelephone system currently in use in Europe, a SIM card is inserted into a radiotelephone for providing subscriber identification, billing information and other information concerning the operation of the radiotelephone. In the GSM system, the same telephone hardware can be used with any SIM card inserted into the SIM card reader of the radiotelephone.

U.S. Pat. No. 5,444,764 discloses a radiotelephone system that includes a radiotelephone having a subscription lock and a removable SIM containing an international mobile subscriber identification (IMSI). The subscriber lock is used to restrict registration into the radiotelephone system to those radiotelephones which contain a SIM card which has an IMSI which falls within a range of valid IMSIs programmed into the radiotelephone and those for which the user has entered a subsidy flag Personal Identification Number PIN) which permanently disables the need for a valid IMSI.

According to U.S. Pat. No. 5,444,764, upon power-up of the radiotelephone, a SIM is inserted by the user into the SIM card reader contained within the radiotelephone. The radiotelephone prompts the user to insert a Personal Identification Number (PIN), which unlocks the SIM card allowing access to the subscriber information contained therein. Alternatively, the SIM card does not require the entry of a PIN number to unlock the subscriber information contained therein. However, the disclosure cautions that the SIM access PIN is not to be confused with the described subsidy flag PIN. Upon entering the SIM card access PIN, the radiotelephone executes a process that registers the radiotelephone for service in the radiotelephone system. Once registered, the radiotelephone is able to send and receive RF signals from a remote transceiver.

U.S. Pat. No. 5,444,764 illustrates a process flow chart describing a method for controlling access to a radiotelephone system. The process is implemented in software in a microprocessor which is embedded in the radiotelephone controller. Prior to executing the process, the following values are initialized by the manufacturer and remain valid for the life of the phone: a PIN retry counter is set to a predetermined value, an unlock counter is set to a predetermined value, a range of valid international mobile subscriber identifications are set, a PIN register is set to a predetermined PIN value and a subsidy flag is either set to 0 or 1 indicating an active subsidy flag, or an inactive subsidy flag.

The process controlling access to a radiotelephone system begins at a decision block where the value of the subsidy flag is determined when the phone is registered for emergency service only. When the value of the subsidy flag is equal to zero, then the subsidy flag is not set, and the radiotelephone registers for full service within the radiotelephone system. If the subsidy flag is set, then the process compares the value of the PIN retry counter to zero at another decision block. If the PIN retry counter is not equal to zero, then the process checks to see if the international mobile subscriber identification falls within the subsidy range of valid IMSIs at a third decision block. If the SIM is within the subsidy range, then the radiotelephone registers for full service in the radiotelephone system. If the SIM falls outside the subsidy range of valid SIMs, then the process requests the user to enter a subsidy flag PIN.

The process compares the subsidy flag PIN entered by the user to a predetermined PIN value stored within the EEPROM in the controller portion of the radiotelephone. If the subsidy flag PIN entered by the user equals the predetermined PIN value, then the subsidy flag is cleared, and the radiotelephone is registered for full service in the radiotelephone system. If the subsidy flag PIN entered by the user is not equal to the predetermined PIN value, then the PIN retry counter is decremented by 1. At yet another decision block, the current value of the PIN retry counter is compared to zero. If the PIN retry counter is not equal to zero then the process returns to the function which requests a user to enter a subsidy flag PIN. If the PIN retry counter value is equal to zero, i.e., all of the predetermined number of PIN retry attempts are exhausted, then the phone becomes locked.

As disclosed in U.S. Pat. No. 5,987,325, the complete disclosure of which is incorporated by reference herein, in radiotelephone systems such as GSM, a SIM card is inserted into a radiotelephone for providing subscriber identification, billing information and other information concerning the operation of the radiotelephone. The SIM is a key component of the GSM and typically comprises a smart card which is inserted into a GSM phone in order to make the phone functional. As described in U.S. Pat. No. 5,987,325, in a typical cellular telephone communication system, each subscriber unit is assigned a mobile subscriber identifier (MSI) which uniquely differentiates the subscriber unit from other subscriber units. In the European cellular communication system, one such identifier is the international mobile subscriber identification number (IMSI).

U.S. Pat. No. 5,987,325 discloses a personal communication system which has a single personal telecommunications device which is operable in all available cellular systems, e.g., AMPS, TDMA, CDMA, GSM, etc. across all available cellular frequencies, e.g., 900 MHz or 1800 MHz as well as satellite frequencies, and which operates like an inexpensive cordless phone when the user is at home. The user has a single phone number that tracks that phone such that wherever the phone is, that is where the user is. In the SIM environment, a user is not constrained to carry his own personal communications device on him at all times, since it is SIM plus a generic, non-user specific communications device which the system sees, as opposed to a specialized, user specific device such as a conventional wireline phone or a conventional non-GSM cellular phone.

U.S. Pat. No. 5,987,325 further discloses a single telephone capable of accepting and responding to multiple SIMs, such that in situations whereby there is only one communications device, but yet several people, each having their own number, desire access to that device. Alternatively, a person may have multiple SIMs, for example, one for personal communications and another for business. Thus, a telephone accepting and responding to multiple SIMs provides multiple unique secure communications in a single device.

In SIM card manufacturing, certain seed information, including the unique identification code for billing and authentication purposes, the fraud prevention algorithm, and a unique serial number cross-referenced to a blank authentication table are provided by the Gateway Business System, a business unit at the Gateway level used for customer management, customer care, retail billing, inventory management, and SIM card commissioning and activation. The seed information is provided in the form of an electronic Pre-Personalization Card Input File (PPC-In file), usually stored and transported on a diskette. The PPC-In file typically includes at least the customer name to be associated with the account; the transport key reference number for the key that will be used for encryption of the key on a PPC-Out file; the starting value for the group of IMSIs to be used; the starting value for SIM card serial number group to be used.

The diskette containing the PPC-In file is provided to the SIM card manufacturer along with a letter instructing where the PPC-Out file, invoice, and completed physical SIM cards are to be delivered. The SIM card manufacturer generates implementation specific information necessary to complete the authentication table, including a unique code tied to the telephone number and keys to the encryption code for satisfying the fraud prevention algorithm. The SIM card manufacturer loads the data into a physical SIM card, thereby completing the authentication table, and creates an electronic PPC-Out file, preferably stored on a diskette. Generally, the physical SIM cards go to the designated service provider (SP) and, in a telecommunications implementation, the PPC-Out file goes to a Gateway Business System. The Gateway Business System receives the PPC-Out file. The Gateway Business System ensures that the Authentication Command (AuC) file is provided to the Gateway network switch providing the interface between the mobile network and the public switched telecommunications network (PSTN), and that the appropriate response file was received. The Gateway Business System then allocates the IMSI resources from the SIM card order to a particular service provider.

In independent telephones accepting one or more SIMs, mobility of the telephone identity is the paramount interest. Such mobility is provided by the plug-in SIM. PINs protect the SIM owner from loss or misappropriation of the SIM. In contrast, implementations fixed in place, in a building or moving vehicle, and providing telephony to multiple users presents a situation wherein mobility of access is irrelevant and the physical SIM cannot be lost. In such implementations, a single microprocessor accesses a database of multiple SIMs. However, While each independent telephone carries its own SIM card, this configuration is impractical for applications requiring multiple SIMs. For example, in avionics applications, where every seatback includes a handset, providing a SIM for each seatback handset is impractical. Rather than provide a SIM card for every seatback and cabin handset, typical airborne mobile cellular systems provide a central transmission control system having one or more RF transmission channels. One SIM card is associated with each channel of the airborne telecommunications unit.

Although the number of communication channels provided in the mobile cellular unit depends upon the specific implementation, one specific implementation provides 30 voice channels and 30 data channels shared among all of the onboard terminals.

Today's SIM cards are physical circuit cards for mounting on a PC board. SIM cards require a mounting connector for interfacing to the PC board, plus support circuitry for addressing and reading the individual SIM cards. The total board space required to supply all the SIM cards necessary for even an eight-channel installation is more than can practically be fitted into the telecommunications unit. Nor will the necessary PC boards fit in the space allotted for a standard Aircraft Personality Module (APM).

Rather than individual SIMs coupled to each onboard terminal, the physical apparatus of a telecommunications unit includes one or more SIM cards interfaced to a main system central processing unit (CPU). The CPU performs the actual receive and transmit functions between the telecommunications unit and the communications network. The interface typically includes a micro-controller, or microprocessor, which controls the individual SIMs. The micro-controller is usually part of a SIM reader, which also includes several interface circuits associated with an individual SIM and allowing the CPU to read the contents of the associated SIM. The terminals convert analog voice input into a digitized serial data stream. The main CPU generally lacks the processing capacity to handle the actual serial data transmitted by the handset. The SIM reader, therefore, converts the serial data stream from the user terminals and relays the resulting parallel data to the main system CPU.

One known implementation includes multiple conventional universal asynchronous receiver-transmitters, or UARTs, each interfacing with one SIM for serial to parallel data conversion so that the data can be received by the system CPU. Another known implementation includes a conventional UART and a micro-controller to interface between the SIMs and the CPU. Still another known implementation includes a conventional UART to manage serial output from the micro-controller for the CPU.

Figure 1:
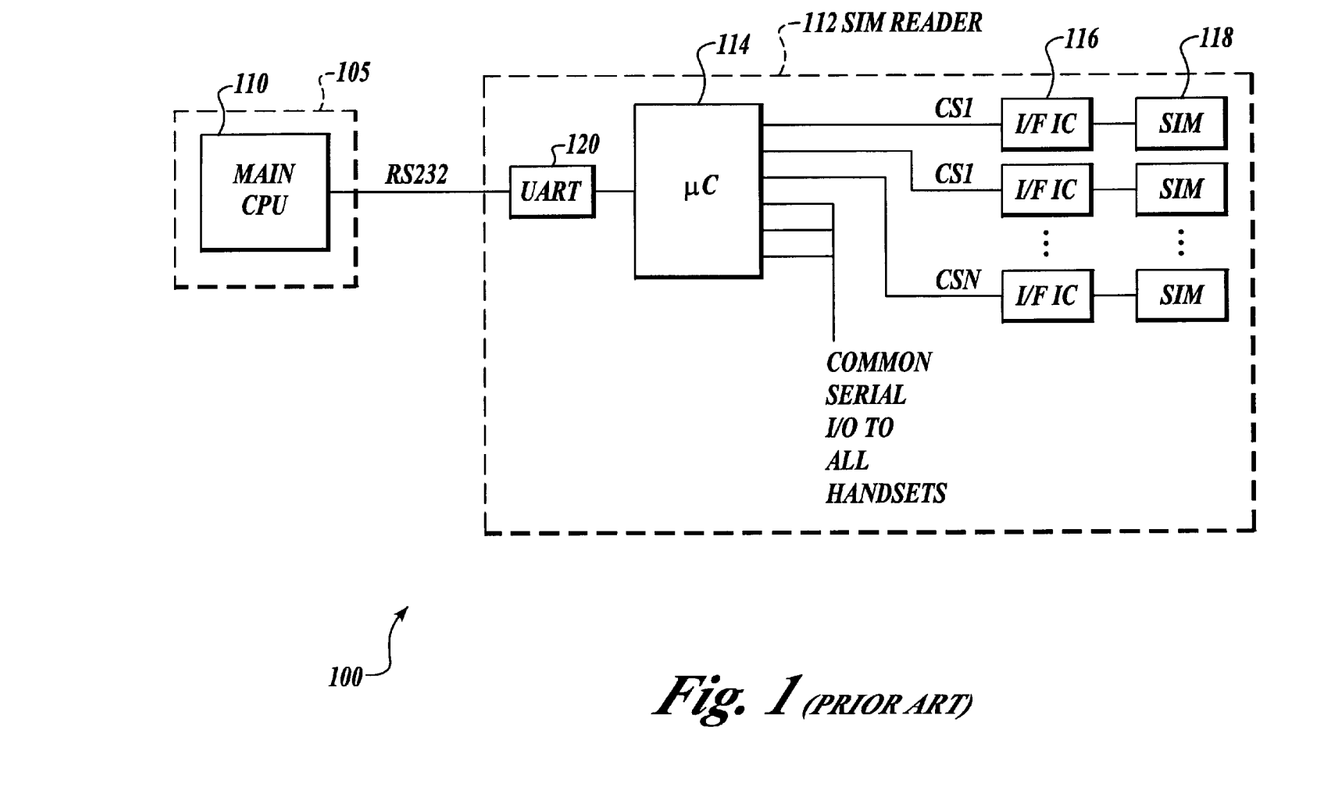
FIG. 1 is a block diagram of one prior art telecommunications unit for communicating between multiple user terminals, such as radio frequency signals between multiple cabin and passenger telecommunication equipment onboard a host aircraft or other vehicle and a satellite constellation for relay to ground stations, the telecommunications unit of the prior art including a control module having a main system central processing unit for performing the actual receive and transmit functions between the telecommunications unit and the satellite constellation, the main system central processing unit interfaced with multiple onboard terminals through multiple physical Subscriber Interface Modules, or SIM cards.

FIG. 1 is a block diagram of one prior art telecommunications unit transmitting and receiving signals between multiple user terminals situated in a central location, such as multiple telephone handsets in a business office using the general GSM cellular network, or cabin and passenger telecommunication equipment onboard a host aircraft or other vehicle, for example, seatback telephone handsets, and a satellite constellation for relay to ground stations. As shown in FIG. 1, the telecommunications unit 100 of the prior art includes a control module 105 having a main system central processing unit, or CPU, 110 performing the actual receive and transmit functions between the telecommunications unit and the satellite constellation. CPU 110 interfaces with multiple user terminals through a SIM card reader 112. In FIG. 1, prior art SIM card reader 112 includes a built-in microprocessor, or micro-controller, 114 coupled via common serial I/O to separate and independent interface circuits 116. Each interface circuit 116 allows microcontroller 114 to access one physical Subscriber Interface Module, or SIM card, 118. Under software control, interface circuits 16 manage the power up, clock frequency and protocol selection procedures. Micro-controller 114 incorporates an address register that it decodes to obtain chip selects for SIM cards 118. These chip selects are used by SIM card interface circuits 116 to access individual SIM cards 118. Micro-controller 114 relays information from SIM cards 118 to CPU 110 over a standard RS232 interface. SIM card reader 112 also includes a universal asynchronous receiver-transmitter, or UART, 120 to manage the serial output of micro-controller 114 by converting the serial data so that it can be received by the parallel port of CPU 110.

The physical SIM cards and support circuitry require physical volume, a resource which is severely limited onboard a host aircraft. Also, the accurate mapping of SIM cards to their associated terminals in the telecommunications unit is critical to functionally enabling a system for operation on the telecommunications network. In a typical installation, the SIM cards are installed in the field. The field installer is required to accurately record each SIM card identification number and note the installation slot to which the SIM card applies. For installations which incorporate multiple SIM cards for handling multiple user terminals, the field installation process provides numerous opportunities for documentation and recording errors. For example, SIM card identification number transposition, mis-entry and/or mis-recording of the physical slot location in which each individual SIM card resides within the telecommunications unit.

Furthermore, field installation of SIM cards eliminates the opportunity for operational verification of the SIM card-to-control system electronic interface prior to installation. Field installation also introduces the potential for contamination of the SIM card's electrical contacts and subsequent degradation in operational reliability.

Also, today's physical SIM cards are designed to best commercial practices, but are intended for use in environments that are benign to human operators. In industrial, military, or aviation environments where operational environments often exceed the bounds of human comfort levels, the reliability of physical SIM cards is significantly degraded. In contrast, the main system CPU of the mobile cellular unit is typically environmentally hardened. Thus, in the combination of SIM card and environmentally hardened CPU, the SIM card represents the weak link, degrading the overall system reliability. When coupled with applications requiring a large number of SIM cards, the overall reliability of the system is degraded below acceptable levels.

The only solution available today is to package the individual physical SIM cards into a single line-replaceable module for mounting in close proximity to the communications control unit. Contributory to the need for a line-replaceable form factor is the limited reliability of the SIM cards in inhospitable environments. These items are presently designed for individual use where a mean-time-between-failures (MTBF) on the order of 12 to 24 months is considered acceptable. In an avionics environment having multiple SIM cards per aircraft installation, the probability of frequent maintenance activity due to a SIM card failure is expected to be unacceptably high, thus necessitating a line-replaceable module. This hypothesized SIM card line-replaceable module fails to address the problems presented in the prior art.

What is needed is a means of providing the SIM card functions for multiple SIM cards in a space no larger than that currently occupied by the control system unit of the telecommunications unit. Preferably, the SIM card functions are provided in a format that overcomes the difficulties of installing and mapping the physical SIM cards to associated terminals in the control system during field installation and maintains full functionality in industrial, military, and aviation operational environments without degrading overall system reliability.

SUMMARY OF THE INVENTION

The present invention overcomes the space, installation, and reliability limitations of the prior art by providing software emulation of user interface module functions in embedded processor applications that replace externally mounted user interface modules. The embedded processor of the invention includes one or more user software interface modules emulating the functions of multiple SIM cards; occupies a space no larger than that currently occupied by the control system unit of the telecommunications unit; and is environmentally hardened to maintain full functionality in industrial, military, and aviation operational environments.

The present invention provides a controller for controlling communication with a telecommunications network, the controller including a unique user data file stored in non-volatile memory and an environmentally hardened processor coupled to the memory. The processor of the invention executing machine instructions to implement several functions provided by the mobile cellular unit and SIM cards of the prior art, the various functions including validating a subscriber's SIM on the telecommunications network and, in cellular implementations, both receiving and transmitting radio frequency transmissions.

According to one aspect of the invention, before installation in a telecommunications unit, the processor is exposed to shock, vibration, and temperature extremes in excess of those shock, vibration, and temperature extremes normally experienced in the intended application environment, for example, the shock, vibration, and temperature extremes normally experienced by avionics electronic hardware.

According to another aspect of the invention, the invention provides a system for communicating with a telecommunications network, wherein the system includes a memory storing machine instructions and unique subscriber identity data. The subscriber data preferably includes a unique subscriber identity, and an identifying authentication key. The communication system of the invention includes a processor coupled to the memory. The processor executes the machine instructions stored in memory to implement various functions, including validating a subscriber's SIM on the telecommunications network, and, in cellular implementations, both transmitting and receiving radio frequency communications via the satellite communication network. The functions executed for validating a subscriber's SIM are a group of SIM emulation functions, which essentially emulate the functions one or more of the prior art physical SIM cards.

According to one aspect of the invention, the SIM emulation functions executed by the processor of the invention include functions that access the unique subscriber identity and identifying authentication key data, and act in concert with a network associated Authentication Center using the identifying authentication key to verify the unique subscriber identity.

According to another aspect of the invention, the SIM emulation functions executed by the processor also include functions that cause the satellite communication network to assign a temporary subscriber identifier to one of the SIM emulation functions and to transmit for a period of time the temporary subscriber identifier in place of the subscriber identity, whereby the subscriber's true identity is rarely broadcast over the air and thereby kept secret. Preferably, the SIM emulation functions executed by the processor include a function that causes the satellite communication network to assign a different temporary subscriber identifier to the SIM emulation function after a period of time.

According to still another aspect of the invention, the invention provides a method for forming the controller of the invention for controlling communications with a telecommunications network. The method of the invention includes the steps of forming a processor for executing the machine instructions that implement the SIM emulation functions. The steps of the method of the invention preferably include coupling a non-volatile EEPROM memory to the processor; storing such data as unique subscriber identity data and an identifying authentication key in the non-volatile memory along with machine instructions for implementing one or more SIM emulation functions. The processor is preferably environmentally hardened by cyclic exposure to pre-defined shock, vibration, and temperature extremes in excess of those expected in the intended application.

According to still other aspects of the invention, the SIM emulation functions executed by the processor are functions validating a subscriber's SIM on the telecommunications network. For example, the SIM emulation functions access the stored unique subscriber identity and identifying authentication key data, and verify the unique subscriber identity in concert with a network associated Authentication Center using the identifying authentication key data.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

The present invention is a method and apparatus for implementing in embedded software the functionality of one or more SIM card either in a surface mountable small outline integrated circuit or in the main system CPU of a mobile cellular unit, thereby providing the SIM card functions for multiple SIM cards in a space no larger than that currently occupied by the control system unit of the airborne mobile cellular unit. Furthermore, the SIM card functions are provided in a format that overcomes the difficulties of installing and mapping the physical SIM cards to associated terminals in the control system during field installation and maintains full functionality in industrial, military, and aviation operational environments without degrading overall system reliability.

While presented in reference to a wireless telecommunications network, the teachings of the present invention have broad applicability to telecommunications systems in general, and in particular to cellular radio systems which are but one example of wireless communications. It will be appreciated, however, that the present invention is not limited to cellular radio systems and may be implemented in non-cellular telecommunications systems as well. Furthermore, the SIM of the invention is equally applicable to any communications systems using multiple SIMs.

At least the AIRSAT® multi-channel telecommunications system commercialized by Honeywell® provides a physical Subscriber Interface Module (SIM), also known as a "Smart-Card" interface between user terminals and the telecommunications network. The SIM card is a removable module that, in combination with a ground-based user terminal or telecommunications unit, allows the user to place or receive telephone calls. SIM cards are used to uniquely identify an individual or entity authorized to receive access to a telecommunication network. Each SIM card includes a microprocessor that provides limited decision-making ability and elementary data storage. Like a small computer, the microprocessor contains an operating system, which executes a proprietary algorithm for fraud prevention, as well as instructions given to it by the telephone. The SIM cards thus provide data and processing that ensure the safety and effectiveness of the data transmission. The memory on the SIM card, typically a 16K EEPROM in today's SIM cards, is structured like a database to provide storage for a variety of data files that contain subscriber and network-related data, including: a unique identification number for the SIM card, a ciphering key used to encrypt and decrypt communications, a SIM service table indicating which SIM card-related services are allocated and activated, registration info for the satellite network, and an access code. Additional optional implementation specific data files allow the network operator to customize users' subscriptions and allow the telephone to perform unique functions.

Furthermore, a secret authentication key, unique to each SIM card, is assigned to the SIM card for verification of the identity of the subscriber's SIM. In GSM-based networks, the SIM card and an Authentication Center (AuC) associated with the network, act together to verify the identity of the subscriber's SIM. One function of the SIM card is to contain an identifying authentication key. Another function of the SIM card is to provide another layer of security by requiring the user to enter a Personal Identification Number (PIN) to use the network. The PIN is preferably chosen by the user and changed at any time. To protect against "hacking," the SIM blocks access after a predetermined number of consecutive entries of false PINs. The SIM card may be unblocked by entering the PIN Unblocking Key (PUK), which is provided to the customer along with the SIM card. The PIN access feature is optionally disabled.

Another optional function of the SIM card is to facilitate roaming between different telecommunication networks by allowing the subscriber information to be de-coupled from the phone. Roaming allows the user to insert a SIM card into a telephone on a different network and obtain service. Since the SIM card contains the user identity, it allows for the portability of the subscription between networks where roaming agreements exist, regardless of the network technology.

Still another optional function of the SIM card is to provide a subsidy lock, or SIM Lock, which is a security mechanism that restricts use of the handset to one SIM card or a specific group of SIM cards. The handset compares information stored in the non-volatile handset memory (EEPROM) to information that is stored in a field on the SIM card. This verification process occurs when the handset is powered up with a properly inserted SIM card, or when a handset is already powered up and a new SIM card is inserted. If the information matches, the subscriber information is confirmed and the handset will operate. If the information does not match, the subsidy lock overrides the network function and only emergency calls can be placed. Currently, there are three types of subsidy locks.

According to one embodiment of the invention, the SIM card functionality is repackaged into an integrated circuit, and preferably, into an 8-pin surface mountable small outline integrated circuit (SOIC). Such programming of the SIM card functions into a SOIC is within the skill of one of ordinary skill in the art of integrated circuit programming. Production of the SOIC is within the expertise of commercial integrated circuit manufacturers. The surface mountable SIM integrated circuit, or SIM IC, requires one third or less of the area of today's physical SIM circuit cards configured for mounting on a PC board. When compared to the necessary combination of the physical SIM circuit card, the mounting connector for interfacing to the PC board, and the support circuitry for addressing and reading the individual SIM cards, the surface mountable SIM IC provides a significant size advantage. The invention further repackages all of the SIM ICs needed for a multichannel mobile cellular unit, such as an eight-channel telecommunications unit, into a single line-replaceable module. The SIM ICs needed for an multichannel mobile cellular unit are packaged into a line-replaceable unit while probably sized larger than the space reserved for a standard Aircraft Personality Module (APM), which is defined by ARINCOR to be 2.0"×2.5"×0.5" inches specifically for use in aircraft, and more specifically for use in air transport aircraft, the package size for the SIM ICs is expected to have greater acceptance in the aviation community than the much larger current package size of a line-replaceable module housing today's physical SIM circuit card, mounting connector, and support circuitry for an eight-channel telecommunications unit.

Furthermore, re-packaging the SIM cards into a surface mountable device increases reliability, thereby permitting placement in an aircraft installation that does not permit ready access for replacement. The down-sized line-replaceable module housing the multiple SIM ICs of the invention also packages the multiple SIM card function in a form that is more easily installed in an aircraft that is already fitted with the standard cable harnesses for an ARINC® 741/761 SatCom system for an airborne installation.

According to the embodiment having multiple SIM ICs packaged in a single line-replaceable module, SIM card manufacturing proceeds as in the prior art description, except that SIM cards are produced as surface mountable integrated circuits by a commercial integrated circuit manufacturer.

While the need for the SIM card functions cannot be eliminated, the functions, such as authentication and elementary data storage for implementation unique information, can be incorporated into the mobile cellular unit embedded processor and memory. Thus, according to other embodiments of the invention, the SIM card functionality is implemented within a software program executed by the CPU of an environmentally hardened embedded processor system. In other words, virtual SIM modules operating on the CPU of the telecommunications unit replace the physical SIM cards of today. Such CPUs having sufficient processing capacity are well known. Prior to installation in a telecommunications unit, the CPU is environmentally hardened by exposure to cyclic shock, vibration, and temperature extremes in excess of those shock, vibration, and temperature extremes normally experienced by electronics hardware in the intended environment. For example, in an airborne installation, the CPU is environmentally hardened by exposure to cyclic shock, vibration, and temperature extremes in excess of those shock, vibration, and temperature extremes normally experienced by avionics electronic hardware, especially by those avionics electronic hardware similarly situated in the aircraft. Such embodiments of the invention resolve reliability concerns related to known SIM cards. Furthermore, the quantity of modules performing the SIM card functions can be raised with little to no impact on overall system reliability using the virtual SIM modules of the invention.

Figure 2:
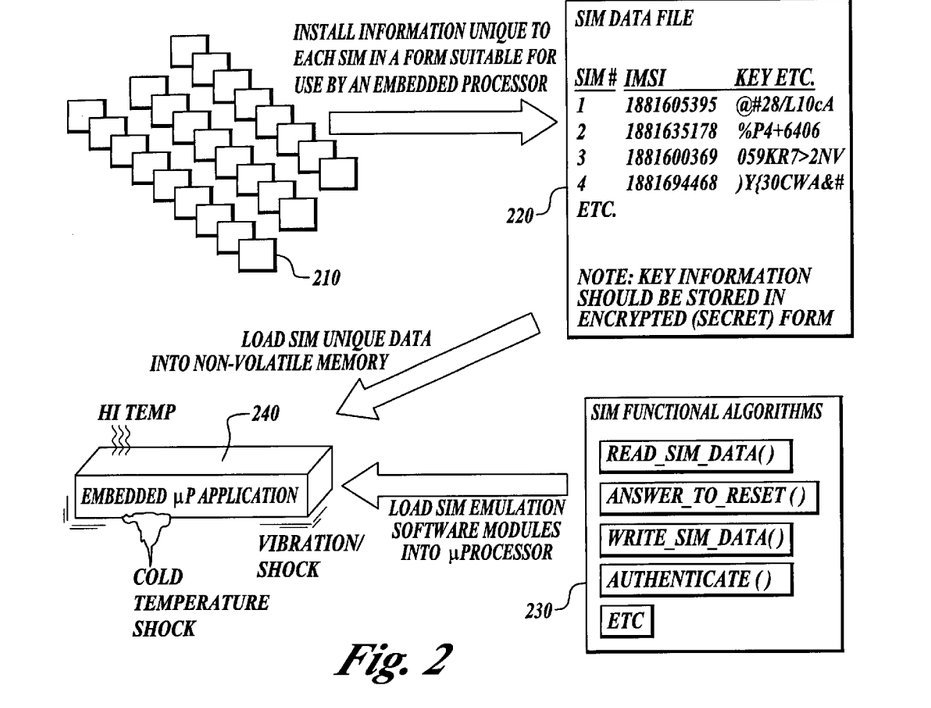
FIG. 2 is a diagram of the hardware implementation of the virtual SIM modules of the invention, whereby the elementary data storage of the SIM card occupies a portion of the embedded micro-processor's non-volatile memory and SIM function emulation software operates on the embedded micro-processor, thereby providing the various functional algorithms executed by the SIM cards of the prior art.

FIG. 2 diagrams the hardware implementation of the virtual SIM modules of the invention, whereby the elementary data storage of the SIM card occupies a portion of the embedded micro-processor's non-volatile memory and SIM function emulation software operates on the embedded micro-processor. The SIM function emulation software includes functional algorithms executed by the SIM cards of the prior art. The virtual SIM modules of the invention have the advantage that no additional hardware outside the control system is necessary. Furthermore, in aircraft installations, the aircraft cabling installations need not account for a physically separate SIM module. The virtual SIM of the invention validates itself on the communication network by participating in a validation process with the network. According to one embodiment of the virtual SIMs of the invention, each virtual SIM is validated by exchanging encrypted signals with the network to authenticate the SIM. Accordingly, each virtual SIM accepts a random challenge signal, usually a random number, from the network; encrypts the random challenge number using a proprietary encryption algorithm and an authorization key; and provides the encrypted number with an optionally encrypted personal identifier. This information is communicated back to the network, whereby the network recognizes the SIM.

In FIG. 2, the unique subscriber identity data 210 normally installed into individual physical SIM cards are encrypted and stored in non-volatile, i.e., EEPROM, memory. Data 210 are stored as data file 220 having a form suitable for use by an embedded processor, such as the main system CPU of an airborne mobile cellular unit, shown in FIG. 1, or another embedded micro-processor accessible by the telecommunications unit. Thus, data file 220 is accessible by an embedded processor.

Emulation software 230 implements all functions normally performed by physical SIM cards 118. The functions are implemented in one or more software program modules loaded into and executed by the embedded processor. Functionally, physical SIM cards appear to be present, however, none of the described size, reliability, or installation limitations of physical SIM cards are retained. Emulation software 230 includes one or more software modules for performing all normal SIM card functions, including accessing the SIM-unique data and unique subscriber identity data 210 stored in the embedded micro-processor's non-volatile memory; decrypting the data where necessary; and performing authentication functions requested by external devices or networks. The programming of emulation software 230 is within the skill of those of ordinary skill in the art without undue experimentation. Differences between specific implementation are expected and are generally within the contemplation of the present invention.

The embedded processor 240, for example, the main system CPU of a multiple SIM telecommunications unit shown in FIG. 2, is environmentally hardened by currently used thermal cycling, and shock and vibration regimens typical of electronic hardware for use in similar environments, such as industrial, military, or aviation environments.

The virtual SIM modules of the invention described in FIG. 2 are implemented using a variety of methods reaching essentially the same result, a software implementation of the SIM card functions in an embedded processor. According to one implementation, the manufacturer of the telecommunications unit operates as a SIM supplier, in which capacity the manufacturer requires access to the proprietary algorithm for fraud prevention presently coded into the SIM cards. In a cellular telecommunications application, each Gateway Business System orders SIM cards from the manufacturer rather than one of the existing SIM manufacturers. The telecommunications unit manufacturer does not ship physical SIM cards. Rather, the manufacturer generates the necessary PPC-Out files, which incorporate the IMSI's and encryption keys, and delivers the PPC-Out file to the appropriate Gateway Business System. Using the same PPC-Out file, the manufacturer generates a unique installation file for each mobile cellular unit hardware configuration, thereby providing all the necessary data for the mobile cellular unit to operate as if it had independent physical SIM cards. The implementation method is essentially transparent to the Gateway Business System, which eases implementation by keeping any administrative overhead within the confines of the mobile cellular unit manufacturer's business entity.

According to another method of implementing the virtual SIM modules of the invention described in FIG. 2, the telecommunications unit manufacturer eliminates any administrative overhead associated with acting as a SIM card manufacturer, while reaching essentially the same result: a software implementation of the SIM card functions in an embedded processor. According to this low-overhead implementation, the Gateway Business System delivers a copy of the PPC-Out file directly to the mobile cellular unit manufacturer. Such an implementation overcomes the need to treat the mobile cellular unit manufacturer as a SIM card manufacturer, but retains the information necessary to create unique installation files for each hardware configuration.

According to yet another method of implementing the virtual SIM modules of the invention described in FIG. 2, the telecommunications unit manufacturer interfaces directly with the network controller for all physical SIM card and virtual SIM module purchases, when the network controller has reserved a block of IMSIs and encryption keys for use in telecommunications systems from the Gateway Business System's block of numbers. Following the sale of a telecommunications unit for installation into an aircraft, the telecommunications unit manufacturer allocates specific SIM IMSIs and encryption keys to the specific aircraft installation and requests the network controller to deliver the appropriate authentication command (AuC) file to program a centrally located Gateway network switch providing the interface between the mobile network and the public switched telecommunications network. Depending on the flag of the customer's carrier, the selected Gateway network switch might very well be loaded with numbers applicable to other Gateway Business Systems.

Figure 3:
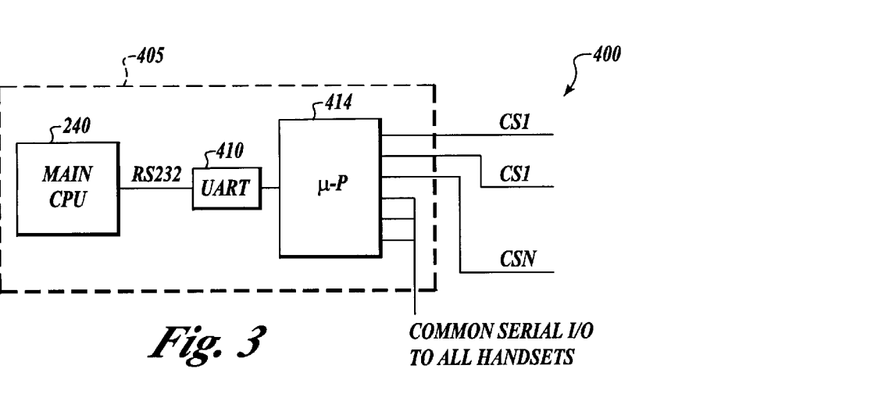
FIG. 3 is a block diagram of one embodiment of a telecommunications unit transmitting and receiving signals between multiple user terminals, the telecommunications unit of the invention including a control module having a main system central processing unit performing the actual receive and transmit functions between the telecommunications unit and the telecommunications network and executing the functions of one SIM card of the prior art using one or more software user interface modules, or virtual SIM modules, each emulating the functions of one SIM card of the prior art.

FIG. 3 is a block diagram of one embodiment of a Gateway network switch unit transmitting and receiving signals between multiple user terminals, such as multiple telephone handsets in a business office using the general GSM cellular network, or cabin and passenger telecommunication equipment onboard a host aircraft or other vehicle, for example, seatback telephone handsets, and a satellite constellation for relay to ground stations. As shown in FIG. 3, the telecommunications unit 400 includes a control module 405 having a main system central processing unit, or CPU, 240 performing the actual receive and transmit functions between the telecommunications unit and the network. In an airborne installation, CPU 240 performs the actual receive and transmit functions between the telecommunications unit and the satellite constellation. CPU 240 includes one or more software user interface modules, or virtual SIM modules, operating on CPU 240. Each virtual SIM module incorporating the functions of one SIM card of the prior art.

Each virtual SIM module preferably incorporates the unique subscriber identity data 210 normally installed into individual physical SIM cards are encrypted and stored in non-volatile, i.e., EEPROM, memory of CPU 240 as data file 220 having a form suitable for use by an embedded processor, such as main system CPU 240, as described above. As described above, emulation software 230, implementing all functions normally performed by physical SIM cards 118, is executed by an embedded processor, such as main system CPU 240. As described above, emulation software 230 includes one or more software modules for performing all normal SIM card functions, including accessing the SIM-unique data and unique subscriber identity data 210 stored in the embedded micro-processor's non-volatile memory; decrypting the data where necessary; and performing authentication functions requested by external devices or networks. CPU 240 interfaces with multiple user terminals through a universal asynchronous receiver-transmitter, or UART, 410 and a built-in microprocessor, or micro-controller, 414.

CPU 240 manages the power up, clock frequency and protocol selection procedures provided by interface circuits 116 in the prior art device. Built-in microprocessor, or micro-controller, 414 includes a common serial I/O port coupled to multiple individual terminals via individual serial lines $CS^1$, $CS^2$ through $CS^N$ for receiving the serial output of each system terminal, for example, cabin and seatback telephone handsets in an airborne installation. Micro-controller 414 relays the serial output of each system terminal to UART 410, which manages the serial output of micro-controller 414 by converting the serial data so that it can be received by the parallel port of CPU 240. UART 410 is coupled to the parallel port of CPU 240 via a standard RS232 interface. Thus, the mobile cellular unit of the invention, incorporating the virtual SIM modules of the invention into the main system CPU overcomes the size, space, installation and reliability limitations of the prior art device. For example, the virtual SIM modules of the invention are also effectively executed by main system CPU 110 of the prior art or another embedded micro-processor accessible by the airborne mobile cellular unit, shown in FIG. 1. Furthermore, the data file portion of the virtual SIM module, data file 220, is optionally stored in either a memory portion of the main system CPU or in a separate memory storage area. Other variations will readily present them selves to those of ordinary skill in the art. Those of ordinary skill in the art will recognize that the invention can be practiced in different structures than that described and shown herein; those variations are intended to lie within the scope of the invention.

While the preferred embodiment of the invention has been illustrated and described, it will be appreciated that various changes can be made therein without departing from the spirit and scope of the invention.

What is claimed is:

1. A system for communicating with a communication network, the system comprising:
    a) a memory having a plurality of machine instructions and a plurality of unique subscriber identity data stored therein;
    b) a processor coupled to said memory, said processor accessing said unique subscriber identity data and executing said plurality of machine instructions to implement a plurality of SIM emulation functions,
    wherein the plurality of unique subscriber identity data are stored in said memory using (i) a software data file that includes at least the plurality of unique subscriber identity data and (ii) one or more installation software files, each installation software file generated based at least in part on the software data file.

2. The system recited in claim 1, wherein:
    said plurality of SIM emulation functions comprise essentially all functions normally performed by one or more physical SIM cards in a satellite communication network application.

3. The system recited in claim 1, wherein:
    said plurality of SIM emulation functions comprise:
        i) validating a SIM on the communication network,
        ii) assigning a temporary mobile subscriber identifier, and
        iii) providing an authentication key.

4. The system recited in claim 3, wherein said assigning a temporary mobile subscriber identifier further comprises causing the communication network to assign a temporary identifier.

5. The system recited in claim 3, wherein said validating the SIM on the communication network fruitier comprises accessing a subscriber identity stored in said memory.

6. The system recited in claim 5, wherein said subscriber identity is stored in said memory in the form of an International Mobile Subscriber Identity.

7. The system recited in claim 5, wherein said validating the SIM on the communication network further comprises:
   accessing said authentication key stored in said memory; and
   verifying said subsciber identity in concert with the communication network using said authentication key.

8. The system recited in claim 3, wherein said plurality of SIM emulation functions further comprises:
   accessing a Personal Identification Number stored in said memory;
   compare one or more numbers entered on a user terminal to said Personal Identification Number;
   counting the quantity of said number entries; and
   accessing the communication network in response to a positive comparison of said one or more entered numbers to said Personal Identification Number and said quantity of number entries being less than a predetermined maximum quantity.

9. A system for communicating with a communication network, the system comprising:
   a) a memory having a plurality of machine instructions and a plurality of subscriber data stored therein, said subscriber data comprising:
      i) a unique subscriber identity data, and
      ii) an identifying authentication key; and
   b) a processor coupled to said memory, said processor executing said plurality of machine instructions to implement a plurality of functions, said functions comprising:
      i) validating a subscriber SIM on the communication network, and
      ii) transmitting and receiving communications via the communication network,
   wherein the unique subscriber identity data are stored in said memory using (i) a software data file that includes at least the unique subscriber identity data and (ii) one or more installation software files, each installation software file generated based at least in part on the software data file.

10. The system recited in claim 9, wherein said plurality of subscriber validating functions further comprises a plurality of SIM emulation functions.

11. The system recited in claim 10, wherein said plurality of SIM emulation functions further comprise:
   i) accessing said unique subscriber identity data,
   ii) accessing said identifying authentication key data, and
   iii) verifying said unique subscriber identity data in concert with a network associated authentication center using said identifying authentication key.

12. The system recited in claim 11, wherein said plurality of SIM emulation functions further comprises causing the communication network to assign a temporary mobile subscriber identifier to one of said SIM emulation functions.

13. The system recited in claim 12, wherein said plurality of SIM emulation functions further comprises causing said processor to transmit said temporary mobile subscriber identifier in place of said unique subscriber identity data.

14. The system recited in claim 13, wherein said plurality of SIM emulation functions further comprises causing the communication network to assign a different temporary mobile subscriber identifier to said one of SIM emulation functions following the expiration of a period of time.

15. The system recited in claim 14, wherein said transmitting and receiving communications via the communication network further comprises transmitting and receiving radio frequency communications via a satellite communication network.

16. A controller for controlling communication with a telecommunication network, the controller comprising:
   a) a unique user data file stored in memory;
   b) an environmentally hardened processor coupled to said memory, said processor executing said plurality of machine instructions to implement a plurality of functions, said functions including:
      i) receiving radio frequency transmissions,
      ii) transmitting radio frequency transmissions, and
      iii) validating a SIM on the telecommunication network,
   wherein the unique user data file is stored in memory using (i) a software data file that includes at least a plurality of unique subscriber identity data and (ii) one or more installation software files, each installation software file generated based at least in part on the software data file.

17. The controller recited in claim 16, wherein prior to installation in a mobile cellular unit, said processor is exposed to shock, vibration, and temperature extremes in excess of those shock, vibration, and temperature extremes normally experienced by electronic hardware intended for use in similar environments.

18. A method for forming a controller for controlling communication with a communication network, the method comprising:
   receiving a software data file that includes at least a plurality of unique subscriber identity data;
   receiving one or more installation software files, each installation software file generated based at least in part on the software data file;
   forming a processor configured to execute at least a plurality of machine instructions to thereby implement a plurality of functions;
   coupling a memory to said processor; and
   storing the plurality of unique subscriber identity data in said memory using the software data file and one or more of the installation files; and
   storing a plurality of machine instructions to implement a plurality of SIM emulation functions using at least the software data file and one or more of the installation software files.

19. The method recited in claim 18, further comprising environmentally hardening said processor.

20. The method recited in claim 19, wherein said environmentally hardening said processor further comprises cyclically exposing said processor to predetermined shock, vibration, and temperature extremes.

21. The method recited in claim 20, wherein said predetermined shock, vibration, and temperature extremes are those extremes normally used to environmentally harden electronic hardware intended for use in similar environments.

22. The method recited in claim 18, further comprising storing an identifying authentication key in said memory.

23. The method recited in claim 22, wherein said plurality of SIM emulation functions further comprises:
   i) accessing at least a portion of said unique subscriber identity data;

ii) accessing said identifying authentication key data; and iii) verifying the accessed unique subscriber identity data in concert with a telecommunications network using said identifying authentication key.

24. The method recited in claim 18, wherein said storing a plurality of machine instructions to implement a plurality of SIM emulation functions further comprises storing a plurality of machine instructions to implement a plurality of functions validating a SIM on the telecommunication network.

* * * * *